June 12, 1945.   E. H. PIRON   2,378,098
SPOKE CONNECTOR
Filed June 17, 1943

Inventor
EMIL H. PIRON,
By Snidow Davis
Attorney

Patented June 12, 1945

2,378,098

UNITED STATES PATENT OFFICE 2,378,098

SPOKE CONNECTOR

Emil H. Piron, New York, N. Y., assignor to Transit Research Corporation, New York, N. Y., a corporation of New York Application June 17, 1943, Serial No. 491,213

3 Claims. (Cl. 287—20.2)

This invention relates to wheel spokes and more particularly to the attachment thereof to the hub and rim portions of a wheel. The wheel referred to is similar to that illustrated in my co-pending application Serial Number 449,452 filed July 2, 1942.

Where spokes resist the hub loading on the rim by bending and by a combination of torsional and bending stresses severe loading occurs at the juncture of the spokes with the hub and with the rim. The pronounced tendency is to break the spokes at those points. It is expensive to enlarge the ends of the spokes to add greater strength and the results are less satisfactory than the solution here revealed. It is therefore the principal object to provide a spoke of uniform radial cross section in combination with an attaching sleeve therefor which will add strength of progressively increasing degree as the point or region of attachment is approached and which is attached to the spoke in such manner that it is never subjected to torsional stresses.

Another object is to provide a spoke attachment which may be neatly attached to the wheel and which also permits neat attachment of the spoke to the wheel, all in the interests of good appearance.

A further object is to provide for easy and economic manufacture and assembly in order to render the wheel acceptable as a substitute for present resilient wheels employing rubber as their springing medium.

Figure 1:
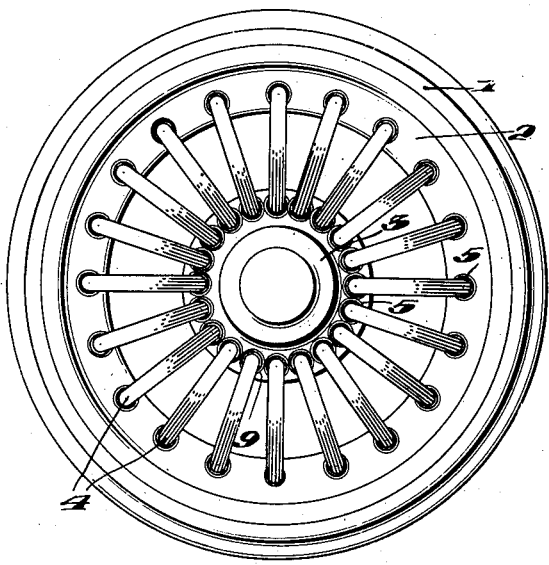
Figure 2:
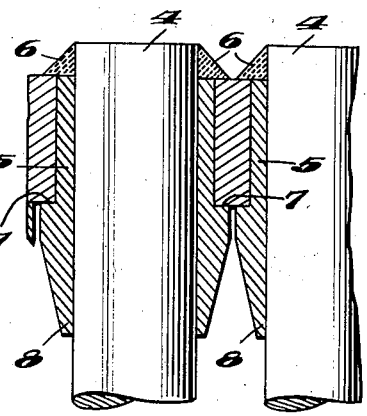
Figure 3:
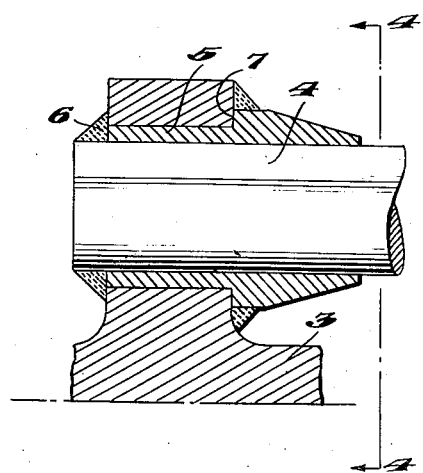
Figure 4:
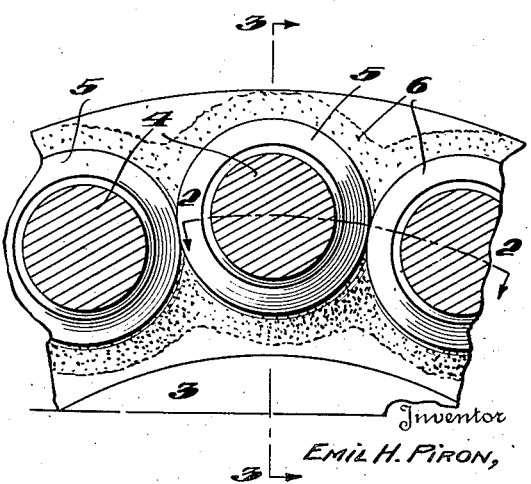

Other objects and advantages will become hereinafter more fully apparent as reference is had to the accompanying drawing in which:

Figure 1 is a side view of a complete wheel equipped with my invention,

Figure 2 is a horizontal diametric section through two adjoining spoke attachments, taken along the line 2—2 of Figure 4, Figure 3 is a vertical diametric section similar to Figure 2 taken along the line 3—3 of Figure 4, and Figure 4 is a front elevation of the spoke attachments welded into place, and taken along the line 4—4 of Figure 3.

Figure 1 illustrates the type of wheel to which my invention is particularly adaptable. The tire or tread member 1 is interiorly thickened to form a rim portion 2 which is maintained in resilient spaced relation from the hub 3 by a multiplicity of spokes 4. The spokes are of U-shape and extend laterally out of the plane of the wheel. The spokes sustain both radial and torque loading and, when rotating are subjected to bending and torsional stresses.

My invention is concerned with the prevention of the localization of the stresses at the points of attachment of the spokes to the hub and rim. The attaching means is identical at both ends of each spoke and is illustrated in the remaining figures in which it will be seen that a sleeve 5 covers substantially the entire end of each spoke 4, the spoke projecting through the sleeve a sufficient distance so that a single weld 6 will unite the spoke to the sleeve and to the hub 3 (or rim 2) and will also unite the end of the sleeve and the hub 3 (or rim 2). The sleeve 5 has a shoulder 7 which limits its insertion into the hub and tapers at 8 towards the end away from the weld to an outside diameter slightly less than that of the cylindrical body portion of the sleeve. By virtue of the taper 8 the sleeve offers resistance to deformation which increases towards the hub and it can yield with bending of its spoke. However, since the sleeve and spoke are not welded or fixedly secured together at any point except at the weld 6 and since this weld spans across to the hub the sleeve is not subjected to torsional stresses. An additional weld 9 may be used to secure the sleeve to the hub without destroying this feature.

Changes in form may be made without departing from the spirit of my invention and I therefore desire to be extended protection as defined by the appended claims in which what I claim is:

1. A coupling for securing to a supporting member a comparatively rigid bar adapted to be subjected to bending and torsional stresses comprising a sleeve having a cylindrical portion terminating at one end is an enlarged shoulder portion, said shoulder portion being tapered to an end outwardly thereof to an outside diameter less than the outside diameter of said cylindrical portion, said sleeve having a cylindrical bore therethrough of a size to receive the bar in snugly fitting relation whereby when the sleeve and bar are welded together at the end of said sleeve away from said tapered end slight relative movement therebetween may occur at said tapered end.

2. The combination of a comparatively stiff bar adapted for subjection to bending and torsional stresses, a rigid supporting member to which said bar is attached and a coupling member between said bar and supporting member comprising a sleeve having a main body portion of cylindrical form and of a length equal to the thickness of said supporting member, said body portion terminating in an enlarged shoulder abutting said supporting member, said shoulder terminating in a tapered end of less outside diameter than that of said cylindrical portion, said bar extending through said sleeve and projecting slightly outwardly through said cylindrical portion and being welded at its end to said sleeve and to said supporting member.

3. The combination of a comparatively stiff bar adapted for subjection to bending and torsional stresses, a rigid supporting member having an opening therethrough, a coupling member between said bar and supporting member comprising a sleeve having a cylindrical portion extending through the opening in said supporting member, said sleeve terminating substantially flush with one end of said opening and tapering from said opening at its other end to a diameter less than that of said cylindrical portion, said bar extending through said sleeve and being welded to said sleeve and to said supporting member at the end of said coupling member opposite its taper, said bar having a snug fit with the interior of said coupling member and being otherwise free in said sleeve from the weld throughout the length of said sleeve.

EMIL H. PIRON.